| (12) | United States Patent | (10) Patent No.: | US 9,316,566 B2 |
|---|---|---|---|
| | Wakazono et al. | (45) Date of Patent: | Apr. 19, 2016 |

(54) TIRE TESTING MACHINE

(71) Applicant: Kobe Steel, Ltd., Kobe-shi (JP)

(72) Inventors: Takehiko Wakazono, Takasago (JP);
Shinichiro Ikai, Takasago (JP);
Munenori Soejima, Takasago (JP);
Takayuki Fukuda, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 174 days.

(21) Appl. No.: 14/185,113

(22) Filed: Feb. 20, 2014

(65) Prior Publication Data

US 2014/0250996 A1    Sep. 11, 2014

(30) Foreign Application Priority Data

Mar. 5, 2013    (JP) .................................. 2013-043102

(51) Int. Cl.
*G01M 17/02* (2006.01)
*B60B 27/00* (2006.01)

(52) U.S. Cl.
CPC ............ *G01M 17/02* (2013.01); *G01M 17/021* (2013.01); *B60B 27/00* (2013.01); *G01M 17/022* (2013.01)

(58) Field of Classification Search
CPC . G01M 17/022; G01M 17/021; G01M 17/02; G60C 23/0408; B60B 27/00; B60B 27/0031; B60B 27/0052; B60B 35/121; G05G 1/04; G05G 5/03; G05G 5/06; G05G 67/00

USPC .................. 73/146–146.8; 152/415–416; 340/442–448
See application file for complete search history.

(56) References Cited

U.S. PATENT DOCUMENTS

| 4,737,222 A * | 4/1988 | Cardenas ............... B29D 30/36 |
|---|---|---|
| | | 152/416 |
| 9,046,444 B2 * | 6/2015 | Wakazono .......... G01M 17/021 |
| 2013/0233066 A1 | 9/2013 | Wakazono et al. |

FOREIGN PATENT DOCUMENTS

| JP | 2012-127794 | 7/2012 |
|---|---|---|
| WO | 2012/081226 A1 | 6/2012 |

\* cited by examiner

*Primary Examiner* — Lisa Caputo
*Assistant Examiner* — Nathaniel T Woodward
(74) *Attorney, Agent, or Firm* — Oblon, McClelland, Maier & Neustadt, L.L.P.

(57) ABSTRACT

A tire testing machine of the present invention includes a bottom chuck that is mounted to a bottom frame, a top chuck that is mounted to a movable beam, a ball screw that causes the movable beam to ascend or descend, and a beam fixing member that fixes the movable beam so as not to ascend. The beam fixing member includes a disk that is fixed to the ball screw and is provided with a plurality of elongated holes and air cylinders that are fixed to the vertical frame and are inserted into the elongated holes. When the pins are inserted into the elongated holes formed in the disk, the top chuck is fixed to the bottom chuck through the movable beam so as not to ascend.

2 Claims, 5 Drawing Sheets

TIRE TESTING MACHINE

BACKGROUND OF THE INVENTION

1. Field of the Invention

The present invention relates to a tire testing machine that performs a tire performance test.

2. Description of the Related Art

As for a tire testing machine, for example, a tire testing machine disclosed in JP 2012-127794 A is known. A tire testing apparatus (tire testing machine) 1 includes vertical frames 30a and 30b that are supported by a bottom frame 20, a beam 40 that is laid between the vertical frames 30a and 30b so as to be movable in the vertical direction, a top chuck 45 that is mounted to the center of the beam 40 in the longitudinal direction, and a bottom chuck 25 that is mounted to the bottom frame 20. The beam 40 descends from an upper standby position, and is fixed while the upper and bottom chucks 25 and 45 engage with each other so as to clamp a tire 10.

When air is supplied to the inner space of the tire clamped between the bottom chuck 25 and the top chuck 45, a separation force generated by an air pressure is exerted on the top chuck 45 so that the top chuck 45 is separated from the bottom chuck 25. In the tire testing apparatus 1, the top chuck 45 is not separated from the bottom chuck 25 by using electromagnetic brakes 33a and 33b (the electromagnetic brakes 33a and 33b are used as a member that maintains the separation force).

SUMMARY OF THE INVENTION

The following problems need to be solved in the tire testing apparatus 1 that uses the electromagnetic brakes 33a and 33b as the member that maintains the separation force.

As a first problem, there is an increase in cost when the electromagnetic brake is employed. In order to reduce the cost, it is desirable to use a separation force maintaining member that has a simpler and practical configuration.

As a second problem, there is a possibility that the brake application position may be deviated when the electromagnetic brake is employed, and hence the repeatability of a rim width of a tire is not ensured at every performance test.

The present invention is made in view of the above-described circumstances, and an object thereof is to provide a tire testing machine including a separation force maintaining member that has a simpler configuration and high repeatability of a rim width (positioning) of a tire.

According to the present invention, there is provided a tire testing machine including: a bottom frame; a pair of vertical frames that is supported by the bottom frame and extends upward in the vertical direction from the bottom frame; a movable beam that is laid across the pair of vertical frames; a first chuck that includes a first spindle rotatable about an axis following the vertical direction; a second chuck that is mounted to the movable beam, is engageable with the first chuck, and includes a second spindle rotatable about an axis following the vertical direction along with the first spindle; a screw shaft that is mounted to the vertical frame and is rotated by a driving unit so as to cause the movable beam to ascend or descend; and a beam fixing member that fixes the movable beam when a gas is supplied to an inner space of a tire clamped between the first chuck and the second chuck. The beam fixing member includes a disk that is fixed to the screw shaft and is provided with a plurality of holes and a disk fixing member that is fixed to a stationary object and includes pins to be inserted into the holes. Then, when the pins are inserted into the holes formed in the disk, the second chuck is fixed to the first chuck through the movable beam.

In the tire testing machine of the present invention, the pins and the disk provided with the plurality of holes are simply used as the separation force maintaining member. Further, according to the structure which fixes the movable beam by inserting the pins into the holes formed in the disk fixed to the screw shaft, the repeatability of the vertical position of the movable beam is ensured by the mechanical structure. That is, the repeatability of the rim width (the positioning) of the tire may be improved.

From these configurations, according to the present invention, it is possible to provide the tire testing machine including the separation force maintaining member that has a simpler configuration and has high repeatability of the rim width (positioning) of the tire.

DESCRIPTION OF THE PREFERRED EMBODIMENTS

Figure 1:
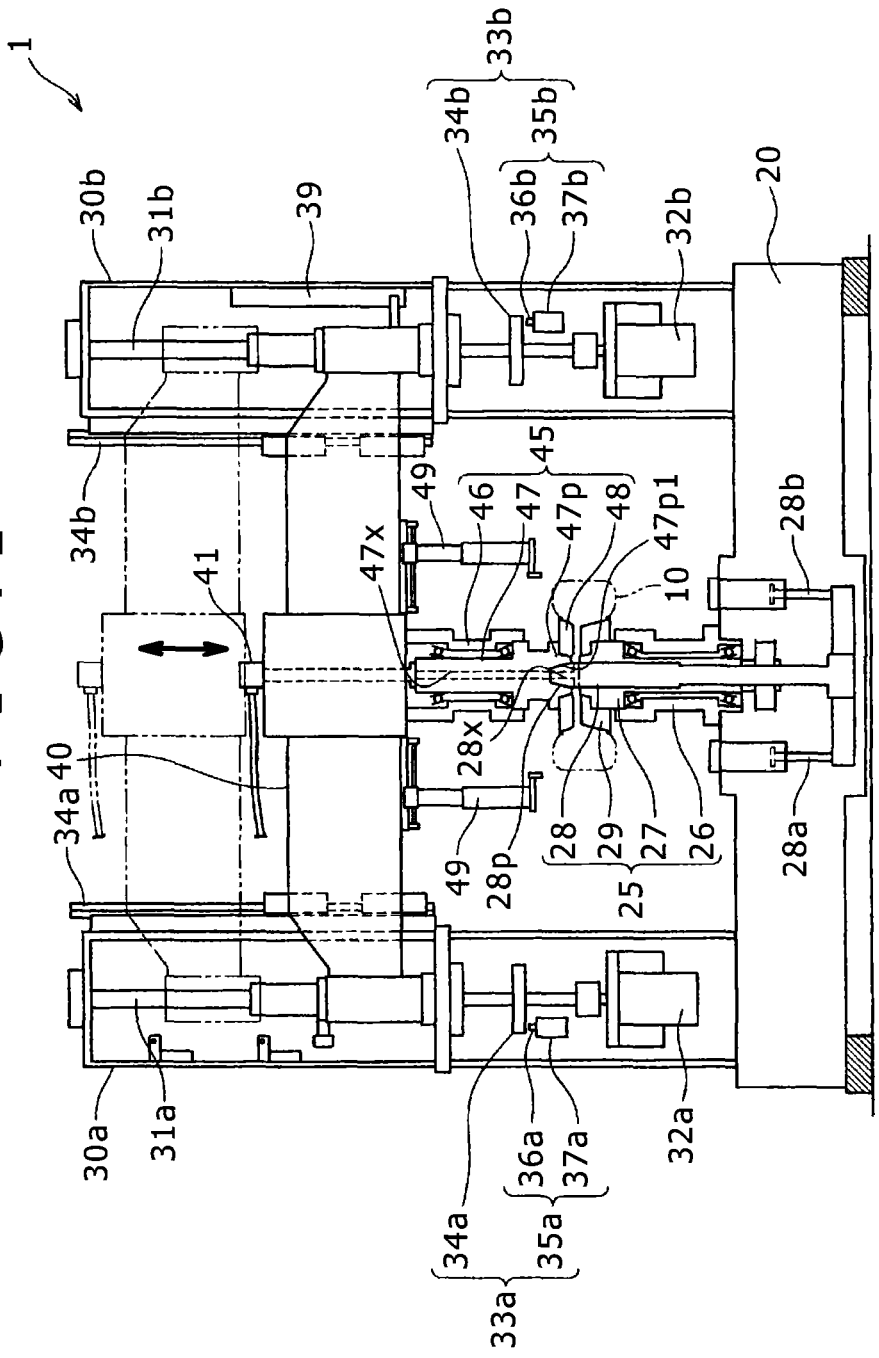
FIG. 1 is a side view illustrating a tire testing machine according to an embodiment of the present invention.

Hereinafter, preferred embodiments of the present invention will be described with reference to the drawings.

(Configuration of Tire Testing Apparatus)

First, the entire configuration of a tire testing apparatus 100 including a tire testing machine 1 according to an embodiment of the present invention will be described with reference to FIG. 2.

The tire testing apparatus 100 includes an entrance conveyor 2, a center conveyor 3, and an exit conveyor 4 in addition to the tire testing machine 1. The conveyors 2, 3, and 4 are disposed so as to convey a tire 10 as a testing target in the conveying direction D.

(Configuration of Tire Testing Machine)

Next, the configuration of the tire testing machine 1 will be described with reference to FIGS. 1, 3, and 4.

As illustrated in FIG. 1, the tire testing machine 1 includes a bottom frame 20, a pair of vertical frames 30a and 30b mounted onto the bottom frame 20, a movable beam 40 laid between the vertical frames 30a and 30b, a bottom chuck (first chuck) 25 mounted to the bottom frame 20, and a top chuck (second chuck) 45 mounted to the movable beam 40.

The bottom frame 20 is made of, for example, a member obtained by welding and bonding steel sheets or a steel material such as H-steel or I-steel, and extends in the horizontal direction The vertical frames 30a and 30b are made of, for example, members obtained by welding and bonding steel sheets or square-shaped steel pipes, and are fixed to an upper surface of the bottom frame 20 by a bolt, a nut, and the like. The vertical frames 30a and 30b are respectively fixed to both ends of the bottom frame 20, and extend from the bottom frame 20 upward in the vertical direction. Linear guides 34a and 34b are respectively mounted to the facing surfaces of the vertical frames 30a and 30b. Further, ball screws (screw shafts) 31a and 31b are respectively mounted to the vertical frames 30a and 30b. The ball screws 31a and 31b extend in the vertical direction inside the respective inner spaces of the vertical frames 30a and 30b.

The movable beam 40 is made of, for example, a member obtained by welding and bonding steel sheets or a steel material such as H-steel or I-steel, and both ends thereof are connected to the respective nut portions of the ball screws 31a and 31b. The movable beam 40 is supported by the pair of vertical frames 30a and 30b through the ball screws 31a and 31b and the linear guides 34a and 34b. Further, the movable beam 40 ascends or descends by the rotation of the ball screws 31a and 31b while being guided by the linear guides 34a and 34b. The position of the movable beam 40 in the vertical direction is detected by a line sensor (which is also called a linear sensor) 39 that is provided in the vertical frame 30b.

Motors (driving units) 32a and 32b are respectively connected to the lower ends of the ball screws 31a and 31b. The ball screws 31a and 31b are rotated by these motors 32a and 32b. Furthermore, the motors 32a and 32b are driven in a synchronized manner.

In the ball screws 31a and 31b, beam fixing members 33a and 33b are provided in the portions between the movable beam 40 and the motors 32a and 32b.

The beam fixing members 33a and 33b are used to fix the movable beam 40 so as not to ascend when air (gas) is supplied to the inner space of the tire 10 that is clamped between a bottom chuck 25 and a top chuck 45. Furthermore, the gas that is supplied to the inner space of the tire 10 may be a nitrogen gas.

The beam fixing members 33a and 33b respectively include disks 34a and 34b and air cylinders (disk fixing members) 35a and 35b.

The disks 34a and 34b are respectively fixed to the portions between the movable beam 40 and the motors 32a and 32b in the ball screws 31a and 31b. The centers of the disks 34a and 34b are identical to the axis centers of the ball screws 31a and 31b.

The disks 34a and 34b will be described with reference to the top views of the disks 34a and 34b illustrated in FIG. 4. Furthermore, since the disk 34a is the same as the disk 34b, the disk 34a will be representatively described.

The disk 34a is provided with a plurality of elongated holes 60 that are provided in the vicinity of the outer peripheral edge thereof so as to extend in the circumferential direction C (the rotation direction) of the disk 34a. The plurality of elongated holes 60 have the same shape and the same dimension, and are provided with the same phase difference in the circumferential direction C of the disk 34a. Further, the plurality of elongated holes have the same distance from the center (the rotation center) O of the disk 34a. Pins 36a and 36b (see FIG. 1) of air cylinders 35 are inserted into the elongated holes 60.

Here, in each elongated hole 60, circular-arc portions 60a and 60b that extend in the circumferential direction C are formed in a circular-arc shape about the center O of the disk 34a. Further, the angles of the centers O1 and O2 of the semi-circular portions 60c and 60d forming both ends of the circular-arc portions 60a and 60b with respect to the center O of the disk 34a are set to 10°. That is, the elongated hole 60 is formed as an elongated hole having an angle of ±5° with respect to the center O of the disk 34a.

Furthermore, the number of the elongated holes 60, the dimensions thereof, and the arrangement (the distance from the center O of the disk 34a) thereof are defined based on the pitch of the ball screw 31a, and are not limited to this embodiment. Further, the hole may not be the "elongated hole" but an exactly circular hole.

A description will be made by returning to FIG. 1. The air cylinders 35a and 35b respectively include cylinder bodies 37a and 37b and pins 36a and 36b each having circular cross-sectional shape. The pins 36a and 36b are adapted to advance or recede from the cylinder bodies 37a and 37b by the pressure of the air supplied to the cylinder bodies 37a and 37b. Furthermore, the cylinder bodies 37a and 37b are respectively fixed to stationary objects (fixed objects) such as the vertical frames 30a and 30b.

When the air cylinders 35a and 35b are operated, the pins 36a and 36b are extended so that the pins 36a and 36b are inserted into the elongated holes 60 formed in the disks 34a and 34b, and hence the disks 34a and 34b are fixed. Accordingly, the ball screws 31a and 31b are also fixed, and hence the top chuck 45 is fixed to the bottom chuck 25 through the movable beam 40 so as not to ascend.

Furthermore, there is no need to essentially use the air cylinders 35a and 35b as the disk fixing members. A hydraulic cylinder or the like may be used. Further, an operator may manually insert the pins 36a and 36b into the elongated holes 60 formed in the disks 34a and 34b.

The top chuck 45 is mounted to the movable beam 40 so as to extend downward from the lower surface at the center of the movable beam 40 in the longitudinal direction.

The top chuck 45 includes an outer housing 46 that is fixed to the movable beam 40, a top spindle (second spindle) 47 that is rotatably disposed inside the outer housing 46, and a top rim 48 that is fixed to the outer periphery of a lower end 47p of the top spindle 47. The center of the lower end 47p of the top spindle 47 is formed as a female tapered portion 47p1 that is opened while being widened downward in the vertical direction. An upper end 28p of a plunger 28 of the bottom chuck 25, which will be described later, is inserted into the female tapered portion 47p1 so as to engage therewith. The female tapered portion 47p1 of the lower end 47p of the top spindle 47, that is, the inner surface of the lower end 47p of the top spindle 47 is formed as an inclined surface that is inclined with respect to the vertical direction at the same angle as that of the upper end 28p of the plunger 28. The top rim 48 is disposed so as to surround the lower end 47p of the top spindle 47, and may rotate about the axis following the vertical direction along with the top spindle 47.

Further, an air supply path 47x is formed inside the top spindle 47 in the vertical direction from the upper end of the top spindle toward the lower end thereof. The air supply path 47x is connected to the rotary joint 41 that is disposed at the upper end of the movable beam 40.

The bottom chuck 25 is mounted to the bottom frame 20 so as to extend upward from the upper surface at the center of the bottom frame 20 in the longitudinal direction.

The bottom chuck 25 includes an outer housing 26 that is fixed to the bottom frame, a bottom spindle (first spindle) 27 that is rotatably disposed inside the outer housing 26, a plunger 28 that is disposed inside the bottom spindle 27 in a telescopic manner, and a bottom rim 29 that is fixed to the upper end of the bottom spindle 27. The bottom spindle 27 rotates about the axis following the vertical direction by the driving of a motor 27m (see FIG. 2). The plunger 28 may rotate about the axis following the vertical direction along with the bottom spindle 27, and may move in a telescopic manner in the vertical direction (may move with respect to the bottom spindle 27) by the driving of the air cylinders 28a and 28b while the bottom spindle 27 may not move in a telescopic manner in the vertical direction. The plunger 28 is a barshaped member, and the upper end 28p thereof is formed as a tapered convex portion (male tapered convex portion) having an inclined surface of which the outer surface is inclined with respect to the vertical direction so that the tapered convex portion is narrowed as it goes toward the front end thereof. The bottom rim 29 is disposed so as to surround the upper end of the bottom spindle 27, and may rotate about the axis following the vertical direction along with the bottom spindle 27.

Figure 3:
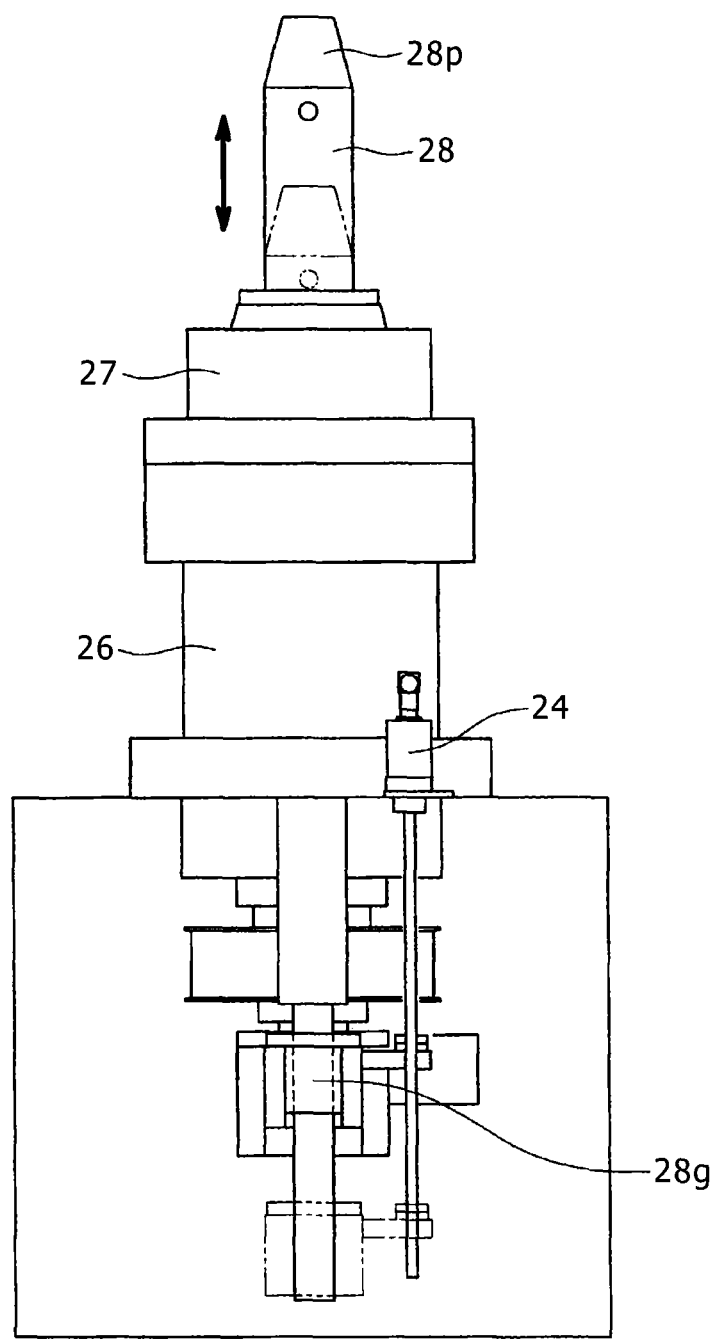
FIG. 3 is an enlarged side view illustrating a bottom chuck of the tire testing machine illustrated in FIG. 1 (where a bottom rim is not illustrated).

A line sensor (which is also called a linear sensor) 24 is attached to a guide member 28g of the plunger 28 (see FIG. 3). The guide member 28g is fixed to the plunger 28, and moves along with the plunger 28. The line sensor 24 is a sensor that detects the position (the vertical position) of the top chuck 45 (the top rim 48) with respect to the bottom chuck 25 (the bottom rim 29), and is configured as a digital line sensor. Since the digital line sensor has a high resolution, it is possible to highly precisely detect the position of the top chuck 45 (the top rim 48) with respect to the bottom chuck 25 (the bottom rim 29) by using the digital line sensor. Furthermore, for example, an analog line sensor may be used instead of the digital line sensor.

Further, the sensor may be a digital line sensor attached to the plunger 28 or may be a digital line sensor built in the air cylinders 28a and 28b.

An air supply path 28x is formed inside the upper end 28p of the plunger 28. The air supply path 28x is a path that causes the air supply path 47x formed in the top spindle 47 to communicate with the inner space of the tire 10.

The top chuck 45 and the bottom chuck 25 are disposed at the vertical facing positions at the center of the bottom frame 20 in the longitudinal direction. That is, the rotation axes of the bottom spindle 27 of the bottom chuck 25, the plunger 28, and the bottom rim 29 are identical to the rotation axes of the top spindle 47 of the top chuck 45 and the top rim 48.

(Tire Testing Method)

Next, a method of testing the tire 10 will be described. Furthermore, the operations of the respective components of the tire testing apparatus 100 mentioned below are controlled by a controller (not illustrated) of the tire testing apparatus 100.

Figure 2:
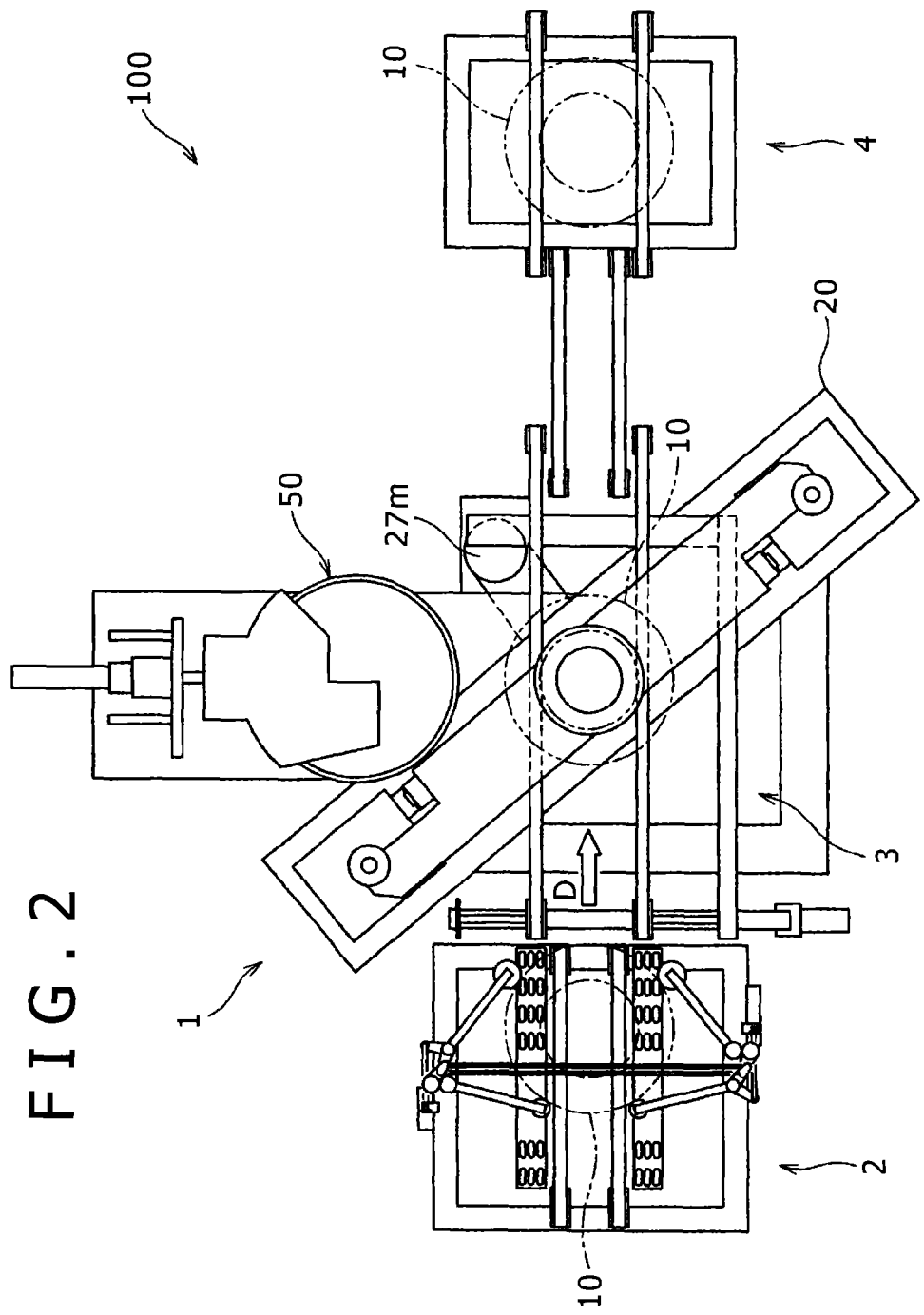
FIG. 2 is a top view illustrating an entire tire testing apparatus including the tire testing machine illustrated in FIG. 1.

The tire 10 is introduced onto the entrance conveyor 2 illustrated in FIG. 2, and lubricant is applied to the bead portion thereof on the entrance conveyor 2. Subsequently, the tire 10 is delivered from the entrance conveyor 2 onto the center conveyor 3. The center conveyor 3 conveys the tire 10 to the position above (directly above) the bottom rim 29 of the bottom chuck 25 illustrated in FIG. 1, and descends while holding the tire 10 so as to place the tire 10 onto the bottom rim 29.

The movable beam 40 is stopped at the uppermost ascending position as the standby position while the tire 10 is delivered from the entrance conveyor 2 onto the center conveyor 3. Furthermore, the movable beam 40 may be stopped at the standby position where the top chuck 45 does not interfere with the tire 10 instead of the uppermost ascending position. Since the standby position of the movable beam 40 is set to the lower position as much as possible in a degree that the top rim 48 does not interfere with the tire 10 in response to the width of the tire 10, it is possible to shorten the time taken for the descending movement of the top chuck 45 from the standby position to the test position to be described later.

The movable beam 40 starts to move downward (descend) from the standby position at the same time when the center conveyor 3 starts to descend. Subsequently, the plunger 28 starts to be extended upward by the driving of the air cylinders 28a and 28b substantially at the same time when the center conveyor 3 starts to descend and the movable beam 40 starts to move downward (descend). The movable beam 40 descends with the rotation of the ball screws 31a and 31b, and the driving of the motors 32a and 32b is controlled while the position of the movable beam 40 is monitored by the line sensor 39.

When the line sensor 39 detects a state where the position of the movable beam 40 becomes close to the engagement position between the upper end 28p of the plunger 28 and the lower end 47p of the top spindle 47, the motors 32a and 32b are controlled so that the motors are decelerated. Alternatively, a limit switch may be provided which detects a state where the position of the movable beam 40 becomes close to the engagement position, and the motors 32a and 32b may be decelerated based on the detection. After the movable beam 40 reaches the engagement position, the movable beam 40 descends further while pressing the plunger 28 by the top spindle 47 of the top chuck 45.

When the line sensor 24 (see FIG. 3) detects a state where the movable beam 40 reaches a test position (a position where the gap between the rims 29 and 48 becomes the specific bead width according to the tire 10) from the engagement position, the motors 32a and 32b are stopped, and hence the rotation of the ball screws 31a and 31b is stopped. At this time, the pins 36a and 36b are extended by the air cylinders 35a and 35b that constitute the beam fixing members 33a and 33b. Accordingly, the pins 36a and 36b are inserted into the elongated holes 60 formed in the disks 34a and 34b fixed to the ball screws 31a and 31b. As a result, the ball screws 31a and 31b are fixed, and the top chuck 45 is fixed through the movable beam 40 so as not to ascend.

Furthermore, when the upper end 28p of the plunger 28 engages with the lower end 47p (the female tapered portion 47p1) of the top spindle 47, the axis center of the bottom chuck 25 is identical to the axis center of the top chuck 45.

In this way, when the top chuck 45 (the top rim 48) is fixed so as not to ascend by the beam fixing members 33a and 33b while being positioned to the bottom chuck 25 (the bottom rim 29) in the vertical direction, the inner space of the tire 10 that is clamped between the upper and bottom chucks 25 and 45 is sealed. In this state, an electromagnetic valve (not illustrated) that is connected to the rotary joint 41 is driven, and compressed air is supplied to the inner space of the tire 10 through the air supply path 47x and the air supply path 28x. Then, the supply of the compressed air is stopped at the timing when the air pressure of the tire 10 becomes a predetermined pressure.

Subsequently, when the driving of the motor 27m illustrated in FIG. 2 is started, the plunger 28, the bottom rim 29, the top spindle 47, and the top rim 48 rotate about the same axis along with the bottom spindle 27, and hence the clamped tire 10 is rotated. At the same time, a drum 50 advances in a direction substantially perpendicular to the conveying direction D, and the drum 50 presses the tread of the tire 10 so as to apply a load to the tire 10.

When various performance tests for the tire 10 are ended, the driving of the motor 27m is stopped, and the rotation of the bottom spindle 27 is stopped. Subsequently, the inner pressure of the tire 10 is released by the electromagnetic valve connected to the rotary joint 41. Then, when the pins 36a and 36b are separated from the elongated holes 60 formed in the disks 34a and 34b by the driving of the air cylinders 35a and 35b, the movable beam 40 is made to ascend or descend by the motors 32a and 32b. Subsequently, the tire 10 is separated from the top rim 48 by the driving of a tire stripper 49.

Subsequently, the center conveyor 3 starts to ascend at the same time when the movable beam 40 starts to ascend. When the center conveyor 3 ascends, the tire 10 is separated from the bottom rim 29 and is placed onto the center conveyor 3. Subsequently, the tire 10 is delivered onto the exit conveyor 4 by the center conveyor 3, and an appropriate marking process is performed thereon on the exit conveyor 4.

(Operation and Effect)

In the tire testing machine 1, as a member that maintains the separation force of the top chuck 45 with respect to the bottom chuck 25 by the air pressure, the disks 34a and 34b provided with the plurality of elongated holes 60 and the pins 36a and 36b are simply used. Further, according to the structure which fixes the movable beam 40 by inserting the pins 36a and 36b into the elongated holes 60 formed in the disks 34a and 34b fixed to the ball screws 31a and 31b, the repeatability of the vertical position of the movable beam 40 is ensured by the mechanical structure. That is, the repeatability of the rim width (the positioning) of the tire 10 may be improved. From these configurations, according to the present invention, it is possible to provide the tire testing machine including the separation force maintaining member that has a simpler configuration and has high repeatability of the rim width (positioning) of the tire.

Here, the shapes of the holes formed in the disks 34a and 34b may be exactly circular shapes having dimensions in which the pins 36a and 36b may be inserted into the holes. However, as in this embodiment, it is desirable that the holes be formed as the elongated holes 60 that extend in the circumferential direction C (the rotation direction) of the disks 34a and 34b.

In order to insert the pins 36a and 36b into the holes formed in the disks 34a and 34b, there is a need to accurately define the rotation angles of the disks 34a and 34b. Meanwhile, the stop precision of the disks 34a and 34b (the stop precision of the ball screws 31a and 31b) is limited, and hence holes each having a size equal to or larger than the pin diameter are needed in order to insert the pins 36a and 36b into the holes. Here, when the hole diameter has an allowance in a case where the hole shape is formed as an exactly circular shape, a force that is generated between the pin and the hole easily concentrates on a local position (a position on one line). Accordingly, the contact surface pressure increases, and hence there is a concern that a disadvantage in strength may occur. As in this embodiment, when the elongated holes 60 are formed so as to extend in the circumferential direction C of the disks 34a and 34b, the pins 36a and 36b may be reliably inserted into the holes, and the contact area between the disks 34a and 34b and the pins is widened. Accordingly, a force generated between the pin and the hole does not concentrate on a local position, so that an increase in contact surface pressure is suppressed and a disadvantage in strength does not occur. Furthermore, in the tire 10 having the same rim width, the insertion holes of the pins 36a and 36b are the same at every time. Accordingly, each of the stop positions of the disks 34a and 34b after the compressed air is supplied to the tire 10 becomes one side of one of the holes (the elongated holes 60) at every time, and the repeatability of the stop position of the movable beam 40 is mechanically ensured.

For example, the appropriate pitch (the advancing distance of the screw for one revolution) of the ball screws 31a and 31b of the tire testing machine 1 of this embodiment is 20 mm. As described above, the elongated hole 60 is formed as the elongated hole of ±5° with respect to the centers O of the disks 34a and 34b. Since the elongated hole 60 is set as above, the positional deviation of the movable beam 40 in the height direction is ±0.28 mm. Although the positional deviation of the movable beam 40 in the height direction becomes ±0.28 mm, when the compressed air is supplied to the tire 10, the pins 36a and 36b contact the disks 34a and 34b at the same position as that of the elongated hole 60 at every time by the biasing force of the compressed air. That is, the repeatability of the stop position of the movable beam 40 is mechanically ensured.

Figure 4:
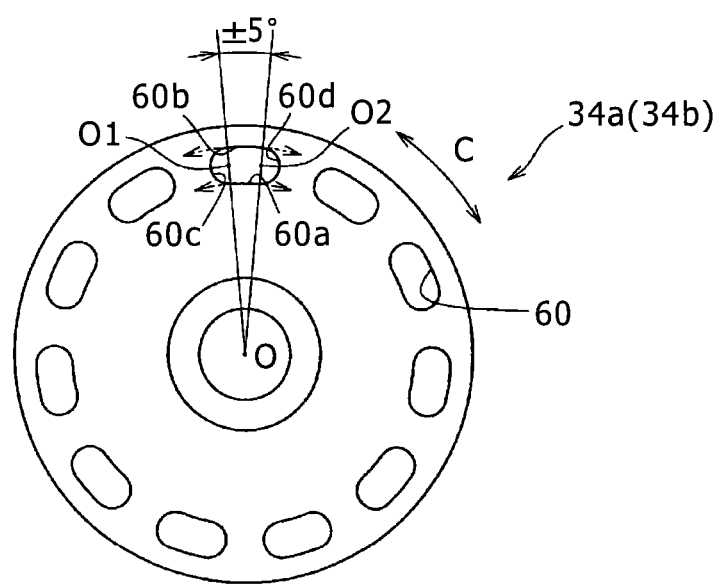
FIG. 4 is a top view illustrating a disk that constitutes a beam fixing member illustrated in FIG. 1.

Furthermore, it is desirable that the elongated hole 60 be formed at the outer peripheral portions of the disks 34a and 34b as in this embodiment instead of the position close to the centers O of the disks 34a and 34b (see FIG. 4). The force that is exerted on the pins 36a and 36b inserted into the elongated holes 60 is small in a case where the elongated holes 60 are formed in the outer peripheral portions of the disks 34a and 34b. Accordingly, the diameters of the pins 36a and 36b may be decreased. Further, compared to the case where the elongated holes 60 are formed at the positions close to the centers O of the disks 34a and 34b, even when the length of the elongated hole 60 in the circumferential direction C is increased, the rotation angles of the disks 34a and 34b may be suppressed to be small. That is, the positional deviation of the movable beam 40 in the height direction may be suppressed to be small.

Further, in this embodiment, the digital line sensor 24 which detects the position of the top chuck 45 with respect to the bottom chuck 25 is provided. Then, the positioning of the top chuck 45 with respect to the bottom chuck 25 is performed based on the signal from the digital line sensor 24, and the pins 36a and 36b are inserted into the elongated holes 60 formed in the disks 34a and 34b.

Since the digital line sensor 24 has a high resolution, the position of the top chuck 45 (the top rim 48) with respect to the bottom chuck 25 (the bottom rim 29) may be highly precisely detected by using the line sensor 24. Furthermore, in this embodiment, the position of the top chuck 45 with respect to the bottom chuck 25 is detected by detecting the extension amount of the plunger 28 using the digital line sensor 24.

Modified Example

Figure 5:
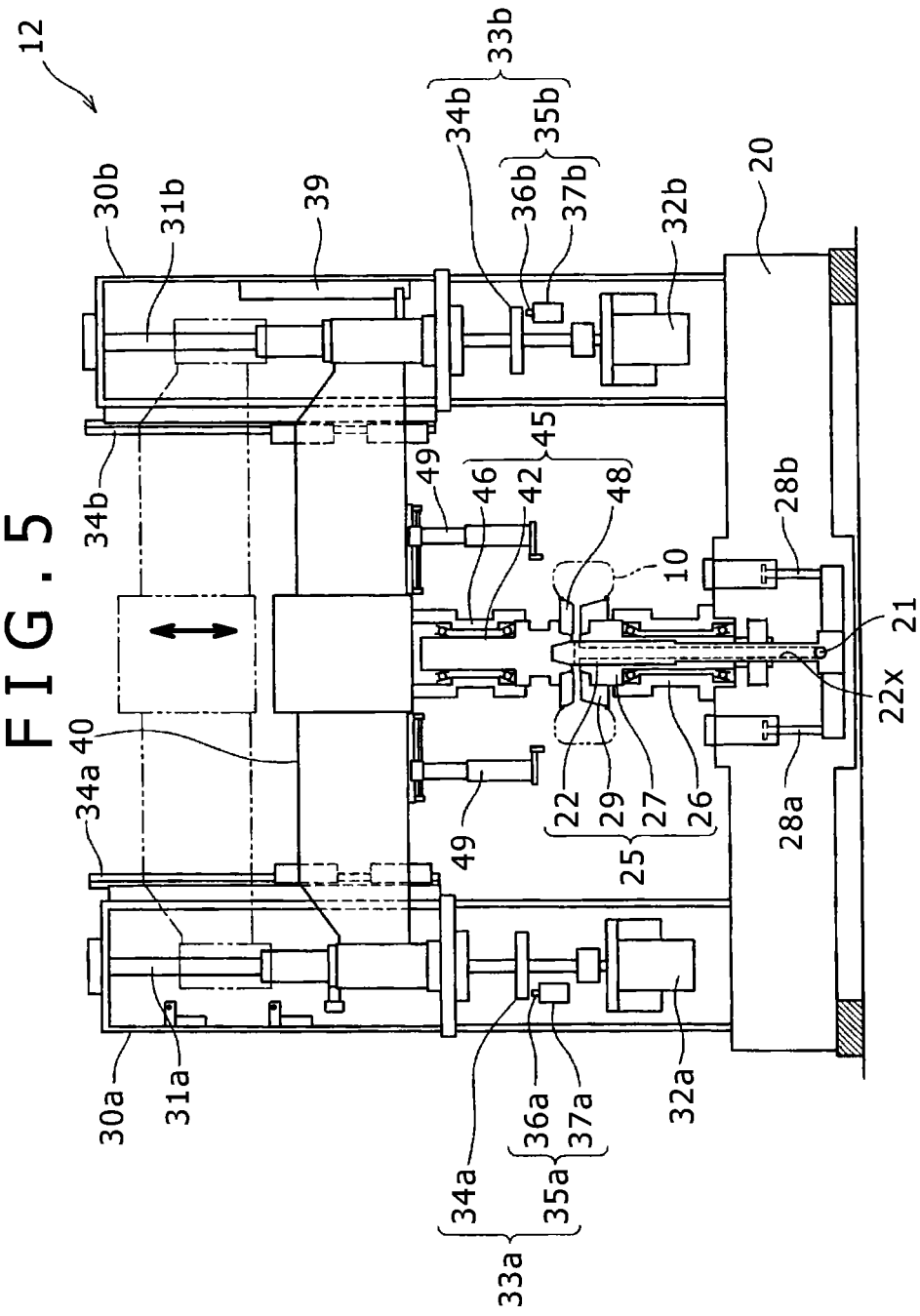
FIG. 5 is a side view illustrating a modified example of the tire testing machine illustrated in FIG. 1.

FIG. 5 is a side view illustrating a tire testing machine 12 according to a modified example of the tire testing machine 1 illustrated in FIG. 1. The tire testing machine 12 is different from the tire testing machine 1 in that an air supply structure with respect to the tire 10 is different, and the other structures are the same as those of the tire testing machine 1. The same reference numerals are given to the same components as those of the tire testing machine 1 illustrated in FIG. 1.

In the tire testing machine 12 of this modified example, the air supply path 22x is formed inside the plunger 22 of the bottom chuck 25 instead of the inside of the top spindle 42 constituting the top chuck 45. For this reason, the rotary joint 21 that is connected to the air supply path 22x is disposed at the lower end of the plunger 22.

In this way, in the tire testing machine 1 illustrated in FIG. 1, the telescopic plunger 28 constituting the bottom chuck 25 is formed so as to be substantially solid, and the air supply path 47x is formed in the top spindle 42 constituting the top chuck 45. On the contrary, in the tire testing machine 12 of this modified example, the air supply path 22x is formed in the telescopic plunger 22 constituting the bottom chuck 25.

While the embodiments of the present invention have been described, the present invention is not limited to the above-described embodiments, and various modifications may be made within the scope of claims.

For example, the bottom chuck 25, the top chuck 45, and the components involved therewith of the above-described embodiments may be disposed while being inversed in the vertical direction as the above-described embodiments. In this case, the top frame may be provided which is fixed to the vertical frames 30a and 30b while being laid between the vertical frames 30a and 30b and being laid across the respective upper portions thereof. Further, the movable beam 40 is laid between the vertical frames 30a and 30b and is laid across the respective lower portions thereof. Then, the first chuck having the first rotatable spindle is mounted to the substantial center of the top frame while being suspended therefrom. Further, the second chuck having the second rotatable spindle and mounted to the movable beam is provided at the position lower than the first chuck and facing the first chuck. In this case, when a gas is supplied to the inner space of the tire clamped between the first chuck and the second chuck, the beam fixing member is fixed to the movable beam so as not to descend.

What is claimed is:

1. A tire testing machine comprising:
    a bottom frame;
    a pair of vertical frames that is supported by the bottom frame and extends upward in the vertical direction from the bottom frame;
    a movable beam that is laid across the pair of vertical frames;
    a first chuck that includes a first spindle rotatable about an axis following the vertical direction;
    a second chuck that is mounted to the movable beam, is engageable with the first chuck, and includes a second spindle rotatable about an axis following the vertical direction along with the first spindle;
    a screw shaft that is mounted to the vertical frame and is rotated by a driving unit so as to cause the movable beam to ascend or descend; and
    a beam fixing member that fixes the movable beam when a gas is supplied to an inner space of a tire clamped between the first chuck and the second chuck,
    wherein the beam fixing member includes a disk that is fixed to the screw shaft and is provided with a plurality of elongated holes elongated in the circumferential direction of the disk and a disk fixing member that is fixed to a stationary object and includes pins to be inserted into the holes,
    wherein the pins have a length in the circumferential direction of the disk which is less than a length of the elongated holes in the circumferential direction of the disk, and
    wherein when the pins are inserted into the holes formed in the disk, the second chuck is fixed to the first chuck through the movable beam.

2. The tire testing machine according to claim 1, further comprising:
    a digital line sensor that detects the position of the second chuck with respect to the first chuck,
    wherein the pins are inserted into the holes formed in the disk after the positioning of the second chuck with respect to the first chuck is performed based on a signal from the line sensor.

* * * * *